Patented Dec. 30, 1941

2,267,988

UNITED STATES PATENT OFFICE 2,267,988

MANUFACTURE OF DERIVATIVES OF PHENANTHRIDINE

Gilbert Thomas Morgan and Leslie Percy Walls, Teddington, England; Frank H. Bell executor of said Gilbert T. Morgan, deceased No Drawing. Application January 5, 1939, Serial No. 249,528. In Great Britain January 13, 1938

2 Claims. (Cl. 260—288)

This invention relates to quaternary salts of the phenanthridine series having valuable trypanocidal properties and to processes for their manufacture.

We have found that the 7-amino-9-(4'-aminophenyl)-10-aklylphenanthridinium salts possess a noteworthy trypanocidal potency which could not have been foreseen from their constitution.

The starting material for these salts is an acylated ortho-xenylamine containing two nitro groups; ring closure of this to the corresponding phenanthridine derivative is effected through the agency of phosphorus oxychloride, preferably in the presence of an inert liquid of high boiling point, such as nitrobenzene. The reaction is as follows:

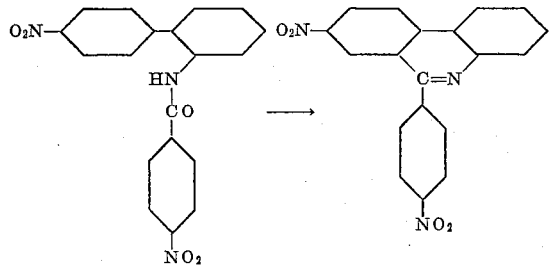

The nitro-compound is reduced by a standard method to the amine and the latter, preferably after protection of the amino groups by acylation, is condensed with methyl para-toluene sulphonate or similar alkylating agent to yield quaternary salts such as

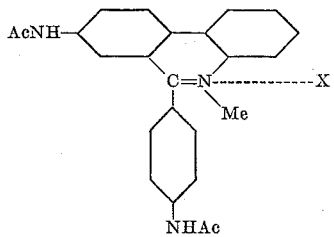

(X=an acid radical) which are then hydrolysed to produce the free amine.

Alternatively, the nitro-compound produced by condensation of the xenylamine derivative may be converted into a quaternary salt which is then reduced to form the quaternary salt of the amino-compound.

The following examples illustrate the invention; the parts are by weight and the temperatures in degrees centigrade; parts by volume are related to those by weight as is the litre to the kilogram.

Example 1

A mixture of 20 parts of 4'-nitro-2-paranitrobenzamidodiphenyl and 40 parts of phosphorus oxychloride was heated for 30 hours; excess of oxychloride was removed by pouring cautiously into water, and the solid product was collected by filtration. Crystallisation of this product from pyridine gave 7-nitro-9-(4'-nitrophenyl)-phenanthridine of M. P. 327°. On reduction with hydrogen (under 5 atmospheres pressure and with a platinic oxide catalyst) in an autoclave, 7-amino-9-(4'-aminophenyl)-phenanthridine, M. P. 212°, was obtained and the diamino-compound was then acetylated. The diacetyl derivative so obtained was caused to react with methyl-para-toluene sulphonate in hot nitrobenzene and after steam distillation of the nitrobenzene, a crystalline quaternary chloride was precipitated by salting out the aqueous liquor with sodium chloride. Hydrolysis of this quaternary salt gave 7-amino-9-(4'-aminophenyl)-10-methylphenanthridinium chloride in glistening ruby-red plates, M. P. (decomp.) 262°.

Example 2

A mixture of 5 parts of 4'-nitro-2-p-nitrobenzamidodiphenyl, 6 parts by volume of phosphorus oxychloride, and 15 parts by volume of nitrobenzene was heated in a bath of metal at 180° for 15 hours. The cold product was cautiously stirred into water, whereupon 4.5 parts of 7-nitro-9-(4'-nitrophenyl)phenanthridine crystallised from the nitrobenzene. No further purification was necessary before conversion into a quaternary salt: one part was dissolved in 7 parts of nitrobenzene at 170° and treated with one part of methyl sulphate. After 30 minutes' boiling nitrobenzene was removed by distillation in steam, whereupon 7-nitro-9-(4'-nitrophenyl)-10-methylphenanthridinium methosulphate separated in the form of buff prisms, almost quantitatively from the aqueous residue. The bright yellow pseudo-base, precipitated by the addition of alkali to the aqueous solution of the methosulphate, dissolved in dilute hydrochloric acid, and from this solution the quaternary chloride crystallised. Either salt was readily reduced by iron and acidified water, and from an aqueous extract of the reaction mixture the quaternary salt described in Example 1 was obtained.

Having thus described the nature of the said invention and the best means we know of carrying the same into practical effect, we claim:

1. As a new article of manufacture, a quaternary 7-amino-9-(4'-aminophenyl)-10-alkyl-phenanthridinium salt, which quaternary salt is soluble in water and has trypanocidal properties.

2. A process of making bactericidal and trypanocidal salts which process consists in causing 7-nitro-9-(4'-nitrophenyl)-phenanthridine to react with an alkylating agent known to be suitable for forming a quaternary salt and then subjecting the quaternary salt to a reduction capable of reducing a nitro-group to an amino-group.

GILBERT THOMAS MORGAN.
LESLIE PERCY WALLS.